Patented Mar. 3, 1953

2,630,445

UNITED STATES PATENT OFFICE 2,630,445

PROCESS FOR THE PREPARATION OF ALUMINUM TRIFORMATE

Paul Delaune, Sotteville, and Roger Huet, Petit Quevilly, France, assignors to Societe Normande de Produits Chimiques, Paris, France No Drawing. Application September 26, 1951, Serial No. 248,446. In France November 29, 1950

9 Claims. (Cl. 260—448)

This invention relates to a process for the preparation of aluminum triformate and more particularly to the preparation of the crystalline substance in a pure dry state.

It is known that aluminum triformate can be prepared by the action of formic acid on freshly prepared aluminum hydroxide (i. e. hydrated alumina) but this method suffers from a number of disadvantages. One of such disadvantages is that the aluminum hydroxide can only be obtained as a very voluminous gelatinous precipitate which is consequently difficult to filter or wash. As a result the hydroxide always retains appreciable amounts of basic ions derived from the aluminum salt from which it is precipitated, such as sulphate, chloride or nitrate ions, which contaminate the aluminum triformate eventually prepared from the hydroxide.

Furthermore, the operations of precipitating, washing and drying the aluminum hydroxide must be performed in a short time in view of the well known fact that the hydroxide changes rapidly and spontaneously after precipitation whereby it becomes passive. When in this condition it is either completely resistant to the action of formic acid or can only be attacked with great difficulty.

Aluminum triformate can be obtained in concentrated solution by double decomposition, at moderate temperatures, of calcium formate and aluminum sulphate but the calcium sulphate which forms in this reaction is also gelatinous and again presents difficulties in filtration on the commercial scale.

In the processes which have been used hitherto the aluminum triformate has been obtained in aqueous solution but, owing to the hydrolysis which occurs during heating, the aluminum formate which is obtained after evaporation of the water is always more or less basic and of indefinite composition. Attempts which have been made to overcome this difficulty include adding to the solution large quantities of free formic acid or various salts or aminated organic compounds which reduce the hydrolysis.

However, none of these prior processes have made it possible to produce a neutral crystalline aluminum triformate in a pure dry state and in an economic manner.

We have now found a process which produces an aluminum triformate of high purity and definite composition in a simple manner with almost quantitative yields.

Accordingly, the present invention provides a process for the preparation of pure dry aluminum triformate which comprises reacting an aqueous solution of formic acid with an aluminum soap of a water-insoluble straight chain hydrocarbon carboxylic acid containing 8 to 18 carbon atoms in the molecule and separating the aluminum triformate from the free carboxylic acid formed.

The preparation of the aluminum soap from the inorganic aluminum salt is the first step in the process. This can be most simply carried out by double decomposition between an aqueous solution of an alkali metal soap of an acid of the kind herein defined and an aluminum salt, such as the sulphate or chloride. This reaction usually gives a yield which is practically quantitative and the aluminum soap, which is insoluble in water, separates automatically from the aqueous phase.

As acids having alkali salts capable of giving aluminum soaps according to the present invention, there may be used saturated or unsaturated acids, or mixtures thereof, having 8 to 18 carbon atoms in the molecule, such as caprylic, lauric, palmitic, stearic and oleic acids, and naphthenic acids.

In the case of mixture of acids, it is usually advantageous to adjust the mixture so as to obtain a melting point of the aluminum soap as low as possible, for example in the region of 100°. In these conditions the addition of an excess of acid to the soap lowers the melting point of the mass still further so that, by simply melting below 100°, the soap so formed is very easily separated from the water present without the necessity for filtering or drying it, thus considerably simplifying the operations. In practice, there are preferably used for the preparation of the soap, organic monobasic acids, or mixtures thereof, wherein the melting point does not exceed 60°, for example oleic acid and naphthenic acids, also the fatty acids of palm oil and coconut oil, the latter having the particular advantage of melting between 22 and 25°.

The aluminum soaps thus prepared occur in a form which is very easy to wash and filter; consequently the mineral ions which contaminate them can be removed without difficulty and the soap isolated in a perfectly pure state.

Unlike aluminum hydroxide, the wet or dry aluminum soaps are not subject to the phenomenon of passivity. If it should be desired to separate and dry such soaps it will always be possible to react them, at any time in the future with formic acid with the same ease as when starting from the freshly prepared product.

The second stage of the process forming the subject of this invention consists in transforming the metallic soap into aluminum formate.

This operation is easily carried out by reacting on the aluminum soap with a quantity of formic acid approximating to the theoretical, and preferably slightly greater.

The simplest method consists in adding formic acid of a high concentration to the aluminum soap which has been prepared according to the method described above and is as free from water as possible. After agitating this mixture at a temperature sufficient to ensure good fluidity the non-basic aluminum formate and the liberated fatty acids rapidly form within the mass. A simple centrifuging operation allows the greater part of the free liquid or molten fatty acid to be eliminated, then the crystalline mass can be treated to remove fatty acid with a suitable solvent, such as carbon tetrachloride or trichlorethylene. There is thus obtained, after drying, an aluminum formate which is perfectly dry and pure. The fatty acid recovered in the distillation of the solvent used for washing the aluminum triformate can be re-used to provide the alkali soap required for the first stage of the operation.

A less concentrated formic acid can equally well be employed but the concentration should always be calculated so that a supersaturated solution of formate is obtained. By working at a temperature at which the liberated fatty acid is liquid or molten the latter floats on the surface of the supersaturated formate solution and on cooling this solution it deposits the pure solid salt.

The invention will be clearly understood from the following example of the preparation of aluminum triformate which is given by way of illustration only.

*Example*

70 kg. of a commercial mixture of fatty acids having a solidification point of 25° C. corresponding to a mean molecular weight of 210, are neutralised with caustic soda at a temperature of 50° in a vessel of wood or aluminum containing 300 litres of water under agitation. The neutralisation is instantaneous.

While maintaining the agitation, about 200 litres of a 20% solution of commercial aluminum sulphate, previously heated to 50° C., are then run onto the soap solution so obtained.

The precipitation of the aluminum soap is instantaneous and the end of the operation is indicated by the presence in the mother-liquor of a trace of aluminum ion, showing a very slight excess of aluminum sulphate. This can otherwise be confirmed by measuring the pH value of the aqueous medium which should be between 5 and 5.5.

The precipitated aluminum soap occurs in the form of small particles which, once the agitation is stopped, collect very rapidly at the upper part of the liquid in the vessel. Washing is then performed continuously by sprinkling with water previously heated to 50° C. and using a rake or any other dispersing means situated in the upper part of the vessel and removing the water continuously from the base of the vessel so that the level remains constant.

The washing operation is stopped when a sample of the discharged water to which barium chloride has been added remains clear thus indicating the absence of $SO_4$ ions.

The fusion operation is then carried out by adding to the vessel 70 kg. of a mixture of fatty acids sufficient to reduce the melting point of the aluminum soap and progressively heating the contents of the vessel with agitation to 100° C. Once this temperature is reached, i. e. when the water in the vessel is boiling slightly, the aluminum soap, together with the added fatty acids, collects on the surface in a homogeneous oily layer which, after standing 2 or 3 hours, is free from water.

The lower aqueous layer is then removed as completely as possible.

The aluminum soap remaining in the vessel is cooled with agitation to 40° and then there is added the amount of formic acid necessary to form with the aluminum present aluminum triformate corresponding to the formula $$Al(OOCH)_3 \cdot 3H_2O$$

the strength of the formic acid can be adjusted by simple calculation to give the desired solution of triformate a concentration between 60 and 90% by weight.

The decomposition of the aluminum soap into aluminum triformate is almost instantaneous. In fact, two easily separable layers are formed immediately, the upper layer consisting of 140 kg. of fatty acids and the lower layer of the supersaturated solution of aluminum triformate. This slightly opalescent supersaturated solution of triformate is separated and passed immediately to the crystalliser after passage, for example, through a small clarifying centrifuge with an imperforate bowl. Of the 140 kg. of fatty acids, 70 kg. are drawn off and will be recycled in the fusion step of the new operation while the 70 kg. of fatty acids remaining in the vessel can be used again in the preparation of the aluminum soap in the next operation.

The supersaturated solution of triformate contained in the crystalliser changes with slight agitation to a friable crystalline mass which, after drying at 45–50° C., yields 25 kg. of aluminum triformate of the composition $Al(OCH)_3 \cdot 3H_2O$ in the form of a micro-crystalline powder completely soluble in water and practically free from impurities.

We claim:

1. A process for the preparation of pure dry aluminum triformate which comprises reacting an aqueous solution of formic acid with an aluminum soap of a water-insoluble straight chain hydrocarbon carboxylic acid containing 8 to 18 carbon atoms in the molecule and separating the aluminum triformate from the free carboxylic acid formed.

2. A process for the preparation of pure dry aluminum triformate which comprises reacting an aqueous solution of formic acid with an aluminum soap of a water-insoluble straight chain hydrocarbon carboxylic acid containing 8 to 18 carbon atoms in the molecule to form a solution of aluminum triformate which is supersaturated at ordinary temperatures, separating said aluminum triformate solution from the free carboxylic acid formed and crystallising aluminum triformate from said solution by cooling.

3. A process for the preparation of pure dry aluminum triformate which comprises preparing an aluminum soap by reacting an alkali metal soap of a water-insoluble straight chain hydrocarbon carboxylic acid containing 8 to 18 carbon atoms in the molecule with an aqueous solution of an inorganic aluminum salt, reacting said aluminum soap with an aqueous solution of formic acid to form a solution of aluminum triformate which is supersaturated at ordinary temperatures, separating said aluminum triformate solution from the free carboxylic acid formed and crystallising aluminum triformate from said solution by cooling.

4. A process for the preparation of pure dry aluminum triformate which comprises preparing an aluminum soap by reacting an alkali metal soap of a water-insoluble straight chain hydrocarbon carboxylic acid containing 8 to 18 carbon atoms in the molecule with an aqueous solution of an inorganic aluminum salt, purifying said aluminum soap by washing with water, reacting said aluminum soap with an aqueous solution of formic acid to form a solution of aluminum triformate which is supersaturated at ordinary temperatures, separating said aluminum triformate solution from the free carboxylic acid formed and crystallising aluminum triformate from said solution by cooling.

5. A process for the preparation of pure dry aluminum triformate which comprises preparing an aluminum soap having a melting point below 100° C. by reacting an alkali metal soap of a water-insoluble straight chain hydrocarbon carboxylic acid containing 8 to 18 carbon atoms in the molecule with an aqueous solution of an inorganic aluminum salt, purifying said aluminum soap by washing with water at a temperature above the melting point thereof, reacting said purified aluminum soap with an aqueous solution of formic acid to form a solution of aluminum triformate which is super-saturated at ordinary temperatures, separating said aluminum triformate solution from the free carboxylic acid formed and crystallising aluminum triformate from said solution by cooling.

6. A process for the preparation of pure dry aluminum triformate which comprises preparing an aluminum soap by reacting an alkali metal soap of a water-insoluble straight chain hydrocarbon carboxylic acid containing 8 to 18 carbon atoms in the molecule with an aqueous solution of an inorganic aluminum salt, reducing the melting point of said aluminum soap to a value below 100° C., by adding thereto a water-insoluble carboxylic acid containing at least 8 carbon atoms in the molecule, purifying said aluminum soap by washing with water at a temperature above the melting point thereof, reacting said purified aluminum soap with an aqueous solution of formic acid to form a solution of aluminum triformate which is supersaturated at ordinary temperatures, separating said aluminum triformate solution from the free carboxylic acid formed and crystallising aluminum triformate from said solution by cooling.

7. A process for the preparation of pure dry aluminum triformate which comprises neutralising with alkali a water-insoluble free straight chain hydrocarbon carboxylic acid containing 8 to 18 carbon atoms in the molecule to form an alkali metal soap, preparing an aluminum soap by reacting said alkali metal soap with an aqueous solution of an inorganic aluminum salt, reacting said aluminum soap with an aqueous solution of formic acid to form a solution of aluminum triformate which is supersaturated at ordinary temperatures, separating said aluminum triformate solution from the free carboxylic acid formed and crystallising aluminum triformate from said solution by cooling.

8. A process for the preparation of pure dry aluminum triformate which comprises neutralising with alkali a water-insoluble free straight chain hydrocarbon carboxylic acid containing 8 to 18 carbon atoms in the molecule to form an alkali metal soap, preparing an aluminum soap by reacting said alkali metal soap with an aqueous solution of an inorganic aluminum salt, purifying said aluminum soap by washing with water, reacting said aluminum soap with an aqueous solution of formic acid to form a solution of aluminum triformate which is supersaturated at ordinary temperatures, separating said aluminum triformate solution from the free carboxylic acid formed and crystallising aluminum triformate from said solution by cooling and repeating the process with at least a part of said free carboxylic acid formed.

9. A process for the preparation of pure dry aluminum triformate which comprises neutralising with alkali a water-insoluble free straight chain hydrocarbon carboxylic acid having a melting point below 60° C. and containing 8 to 18 carbon atoms in the molecule to form an alkali metal soap, preparing an aluminum soap by reacting said alkali metal soap with an aqueous solution of an inorganic aluminum salt, purifying said aluminum soap by washing with water at a temperature above the melting point thereof, reacting said purified aluminum soap with an aqueous solution of formic acid to form a solution of aluminum triformate which is supersaturated at ordinary temperatures, separating said aluminum triformate solution from the free carboxylic acid formed and crystallising aluminum triformate from said solution by cooling.

PAUL DELAUNE.
ROGER HUET.

REFERENCES CITED

The following references are of record in the file of this patent:

UNITED STATES PATENTS

| Number | Name | Date |
|---|---|---|
| 2,019,415 | Jochem | Oct. 29, 1935 |

OTHER REFERENCES

Chem. Ztg., volume 61, pages 925–927 (1937).